United States Patent
Mehran

(10) Patent No.: US 12,495,344 B2
(45) Date of Patent: Dec. 9, 2025

(54) WIRELESS TELECOMMUNICATIONS NETWORK

(71) Applicant: BRITISH TELECOMMUNICATIONS PUBLIC LIMITED COMPANY, London (GB)

(72) Inventor: Farhad Mehran, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 18/833,036

(22) PCT Filed: Dec. 15, 2022

(86) PCT No.: PCT/EP2022/086248
§ 371 (c)(1),
(2) Date: Jul. 25, 2024

(87) PCT Pub. No.: WO2023/143807
PCT Pub. Date: Aug. 3, 2023

(65) Prior Publication Data
US 2025/0113276 A1    Apr. 3, 2025

(30) Foreign Application Priority Data
Jan. 26, 2022  (GB) ..................... 2201009

(51) Int. Cl.
*H04L 5/00* (2006.01)
*H04W 36/08* (2009.01)
(Continued)

(52) U.S. Cl.
CPC .......... *H04W 36/20* (2013.01); *H04L 5/0005* (2013.01); *H04L 5/0037* (2013.01);
(Continued)

(58) Field of Classification Search
CPC ..... H04L 5/001; H04L 5/0003; H04L 5/0005; H04L 5/003; H04L 5/0037; H04L 5/0058;
(Continued)

(56) References Cited

U.S. PATENT DOCUMENTS

| | | |
|---|---|---|
| 2004/0235510 A1 | 11/2004 | Elicegui et al. |
| 2010/0039948 A1 | 2/2010 | Agrawal et al. |

(Continued)

FOREIGN PATENT DOCUMENTS

| | | |
|---|---|---|
| CN | 107466069 A | 12/2017 |
| CN | 110418399 A | 11/2019 |

(Continued)

OTHER PUBLICATIONS

Intention to Grant received for Great Britain Patent Application No. 2201009.4, mailed on Nov. 20, 2023, 2 pages.
(Continued)

*Primary Examiner* — Matthew W Genack
(74) *Attorney, Agent, or Firm* — EIP US LLP

(57) ABSTRACT

This disclosure provides a method of managing users in a wireless telecommunications network having a first access point and a second access point, wherein the first access point communicates with a first set of users using Non-Orthogonal Multiple Access (NOMA) and the second access point communicates with a second set of users using NOMA, the method including obtaining data indicating Inter-User-Interference (IUI) for users of the first access point; obtaining data indicating IUI for users of the second access point; and based on the IUI for users of the first access point and the IUI for users of the second access point, identifying one or more users to transfer between the first and second access point; and causing a transfer of the one or more users identified for transfer.

7 Claims, 10 Drawing Sheets

(51) Int. Cl.
*H04W 36/20* (2009.01)
*H04W 72/543* (2023.01)

(52) U.S. Cl.
CPC .......... *H04L 5/0073* (2013.01); *H04W 36/08* (2013.01); *H04W 72/543* (2023.01)

(58) Field of Classification Search
CPC .... H04L 5/0073; H04W 36/08; H04W 36/16; H04W 36/18; H04W 36/185; H04W 36/20; H04W 36/22; H04W 72/50; H04W 72/54; H04W 72/543
See application file for complete search history.

(56) References Cited

U.S. PATENT DOCUMENTS

| | | |
|---|---|---|
| 2011/0188472 A1 | 8/2011 | Jeon et al. |
| 2014/0066092 A1 | 3/2014 | Scheim et al. |
| 2018/0376409 A1 | 12/2018 | Tani et al. |
| 2019/0140741 A1 | 5/2019 | Cheng |
| 2019/0363843 A1 | 11/2019 | Gordaychik |
| 2021/0028830 A1 | 1/2021 | Kim et al. |
| 2021/0204186 A1 | 7/2021 | Bodduru et al. |

FOREIGN PATENT DOCUMENTS

| | | | | |
|---|---|---|---|---|
| CN | 111741530 | A | 10/2020 | |
| CN | 108513348 | B | 1/2021 | |
| CN | 113286355 | A | 8/2021 | |
| EP | 3270647 | A1 | 1/2018 | |
| KR | 102177427 | B1 | 11/2020 | |
| WO | 0163960 | A1 | 8/2001 | |
| WO | WO-2016062120 | A1 * | 4/2016 | ............. H04B 1/707 |
| WO | 2017117340 | A1 | 7/2017 | |
| WO | 2018220637 | A1 | 12/2018 | |
| WO | 2021206464 | A1 | 10/2021 | |
| WO | 2021251153 | A1 | 12/2021 | |
| WO | 2023143807 | A1 | 8/2023 | |

OTHER PUBLICATIONS

International Preliminary Report on Patentability received for PCT Patent Application No. PCT/EP2022/086248, mailed on Apr. 12, 2024, 11 pages.
International Preliminary Report on Patentability received for PCT Patent Application No. PCT/EP2022/086249, mailed on Apr. 12, 2024, 15 pages.
International Search Report and Written Opinion received for PCT Patent Application No. PCT/EP2022/086248, mailed on Apr. 6, 2023, 14 pages.
International Search Report and Written Opinion received for PCT Patent Application No. PCT/EP2022/086249, mailed on Apr. 5, 2023, 11 pages.
International Search Report and Written Opinion received for PCT Patent Application No. PCT/EP2023/053398, mailed on May 11, 2023, 13 pages.
Office Action received for Great Britain Patent Application No. 2201009.4, mailed on Jun. 27, 2022, 6 pages.
Office Action received for Great Britain Patent Application No. 2201010.2, mailed on Jun. 30, 2022, 5 pages.
Office Action received for Great Britain Patent Application No. 2204125.5, mailed on Sep. 1, 2022, 6 pages.
Written Opinion of the International Preliminary Examining Authority received for PCT Patent Application No. PCT/ EP2022/086248, mailed on Jan. 9, 2024, 9 pages.
Written Opinion of the International Preliminary Examining Authority received for PCT Patent Application No. PCT/ EP2022/086249, mailed on Dec. 4, 2023, 6 pages.
Aoudia , et al., "End-to-end Learning for OFDM: From Neural Receivers to Pilotless Communication", Available at: arXiv:2009.05261v2, Oct. 13, 2020, pp. 1-30.
Chen , et al., "Resource Allocation for the 4G and 5G Dual-Connectivity Network with NOMA and NR", International Conference on Communications, 2022, pp. 3784-3789.
Dai , et al., "A Survey of Non-Orthogonal Multiple Access for 5G", IEEE Communications Surveys & Tutorials, vol. 20, No. 3, Third Quarter, 2018, pp. 2294-2323.
ETSI TS 137 340 V16.2.0 (Sep. 2020) , "Universal Mobile Telecommunications System (UMTS); LTE; 5G; NR; Multi-connectivity; Overall description; Stage-2 (3GPP TS 37.340 version 16.2.0 Release 16)", 650 Route des Lucioles F-06921 Sophia Antipolis Cedex—France, Sep. 2020, pp. 1-80.
Li , et al., "Intelligent Offloading for NOMA-Assisted MEC via Dual Connectivity", IEEE Internet of Things Journal, vol. 8, No. 4, Feb. 15, 2021, pp. 2802-2813.
martínez , et al., "Improved Robustness for Channel Estimation Without Pilots for DVB-T2", IEEE International Symposium on Broadband Multimedia Systems and Broadcasting, 2010, pp. 1-5.
Office Action received for Great Britain Patent Application No. 2201010.2, mailed on Jul. 3, 2024, 4 pgs.
Intention to Grant received for Great Britain Patent Application No. GB2201010.2 , mailed on Sep. 11, 2024, 2 pgs.
International Preliminary Report on Patentability received for PCT Patent Application No. PCT/EP2023/053398, mailed on Oct. 3, 2024, 9 pgs.

* cited by examiner

WIRELESS TELECOMMUNICATIONS NETWORK

PRIORITY CLAIM

The present application is a National Phase entry of PCT Application No. PCT/EP2022/086248, filed Dec. 15, 2022, which claims priority from GB Application No. 2201009.4, filed Jan. 26, 2022, each of which hereby fully incorporated herein by reference.

TECHNICAL FIELD

The present disclosure relates to a wireless telecommunications network implementing Non-Orthogonal Multiple Access (NOMA).

BACKGROUND

Wireless telecommunications networks use multiple access schemes to enable multiple users to simultaneously communicate with an access point. Most multiple access schemes work by allocating orthogonal resources (that is, resources that do not interfere with one another) to users, such as different time slots in Time Division Multiple Access (TDMA) or different frequencies in Frequency Division Multiple Access (FDMA). It has been proposed to use a Non-Orthogonal Multiple Access (NOMA) scheme in which multiple users use the same resources concurrently. This theoretically achieves improved data rates as each user may use more resources than would otherwise be available under an orthogonal multiple access scheme. The NOMA schemes rely on the receiver implementing signal processing techniques to decode the original signal.

Power Domain NOMA (PD-NOMA) is one implementation of NOMA. In this implementation, downlink transmissions from an access point to each user of a plurality of users are allocated different power levels based on the users channel quality such that a user with a higher quality channel is allocated a lower transmission power than a user with a lower quality channel. As the signals for the users are transmitted using the same resources, the user having a higher quality channel has to subtract the signal for the user having a lower quality channel in order to detect their own signal. Existing channel estimation techniques are used to determine the channel quality for each user when allocating the transmission power levels to each user. For uplink communications, each user transmits a signal to the access point, and the access point detects the signal from the user with the strongest received power using interference cancellation techniques and treating signals for other users as noise. The signal for the user having the second strongest received power is then detected using interference cancellation techniques by subtracting the signal for the strongest user and treating any signals for other users as noise. This iterative process continues until all signals for all users have been detected.

SUMMARY

According to a first aspect of the disclosure, there is provided a method of managing users in a wireless telecommunications network having a first access point and a second access point, wherein the first access point communicates with a first set of users using Non-Orthogonal Multiple Access (NOMA) and the second access point communicates with a second set of users using NOMA, the method comprising obtaining data indicating Inter-User-Interference (IU), for users of the first access point; obtaining data indicating IUI for users of the second access point; and based on the IUI for users of the first access point and the IUI for users of the second access point, identifying one or more users to transfer between the first and second access point; and causing a transfer of the one or more users identified for transfer.

Identifying one or more users to transfer may be to reduce a difference between the IUI for users of the first access point and the IUI for users of the second access point.

Identifying one or more users to transfer may be to cause the IUI for users of the first access point to satisfy a first IUI target and/or to cause the IUI for users of the second access point to a satisfy a second IUI target.

The first IUI target may be based on a Quality of Service (QoS) requirement for the first set of users and the second IUI target may be based on a QoS requirement for the second set of users.

The first access point may communicate with the first set of users using Power Domain NOMA, PD-NOMA, and the second access point may communicate with the second set of users using PD-NOMA.

According to a second aspect of the disclosure, there is provided a computer program comprising instructions which, when the program is executed by a computer, cause the computer to carry out the method of the first aspect of the disclosure.

According to a third aspect of the disclosure, there is provided a data processing apparatus comprising a processor configured to perform the method of the first aspect of the disclosure.

BRIEF DESCRIPTION OF THE FIGURES

In Order that the Present Disclosure May be Better Understood, Embodiments Thereof Will Now be Described, by Way of Example Only, with Reference to the Accompanying Drawings in which.

DETAILED DESCRIPTION OF EMBODIMENTS

Figure 1:
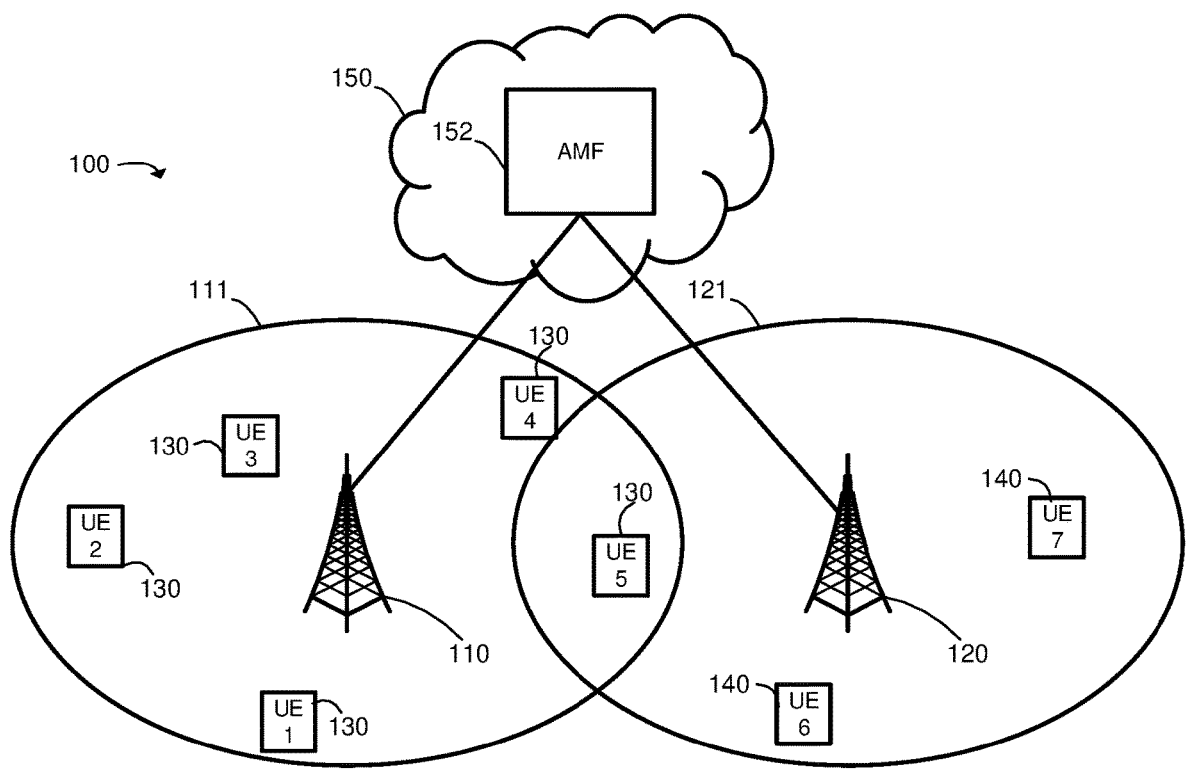
FIG. 1 is a schematic diagram of a first embodiment of a wireless telecommunications network of the present disclosure.

A first embodiment of a wireless telecommunications network of the present disclosure will now be described with reference to FIGS. 1 to 3. In this first embodiment, the wireless telecommunications network is a cellular telecommunications network 100 operating according to the 5$^{th}$ Generation (5G) protocol as standardized by the 3$^{rd}$ Generation Partnership Project (3GPP).

The cellular telecommunications network 100 of this first embodiment includes a first base station 110 having a first coverage area 111. The first base station 110 serves a first plurality of users—UE1 to UE5 (each having reference numeral 130 in FIG. 1).

The cellular telecommunications network 100 also includes a second base station 120 having a second coverage area 121, which partially overlaps the first coverage area 111 of the first base station 110. The second base station 120 serves a second plurality of users—UE6 to UE7 (each having reference numeral 140).

The cellular telecommunications network 100 also includes a core network 150, having an Access and Mobility Function (AMF) 152.

Figure 2:
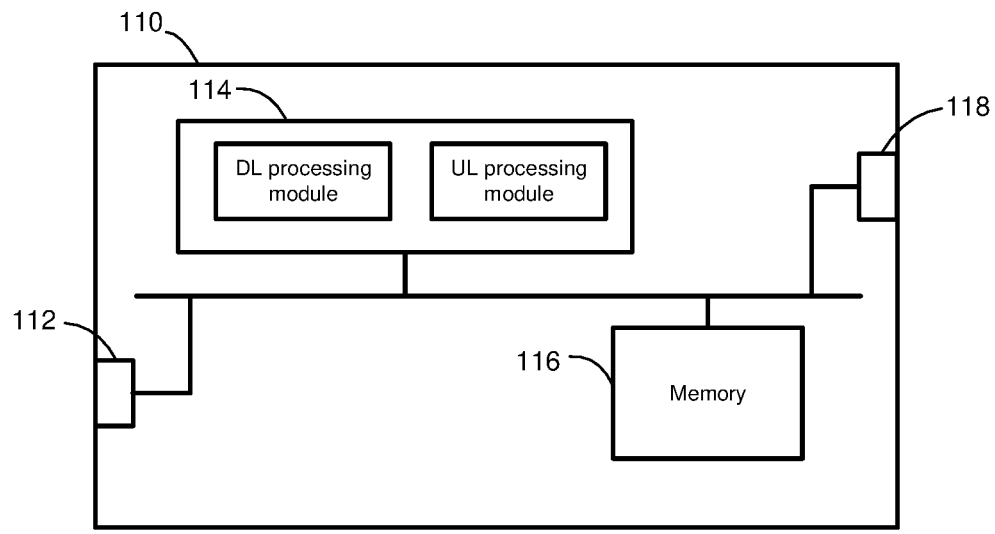
FIG. 2 is a schematic diagram of a base station of the network of FIG. 1.

The first base station 110 is shown in more detail in FIG. 2. The first base station 110 includes a first communications interface 112, processor 114, memory 116, and second communications interface 118. The first communications interface 112 is configured for backhaul communications with a core network 150. The second communications interface is configured for wireless communications with each user of the first plurality of users 130 using a Power Domain Non-Orthogonal Multiple Access (PD-NOMA) scheme, such that, in downlink communications, the first base station 110 uses a particular transmission power level for each user and, in uplink communications, the first base station 110 is able to detect each user's signal from a composite signal. The processor 114 therefore contains a downlink processing module configured to calculate a transmission power for each user and an uplink processing module configured for successive interference cancellation of the composite signal.

The second base station 120 includes the same components as the first base station 110.

Figure 3:
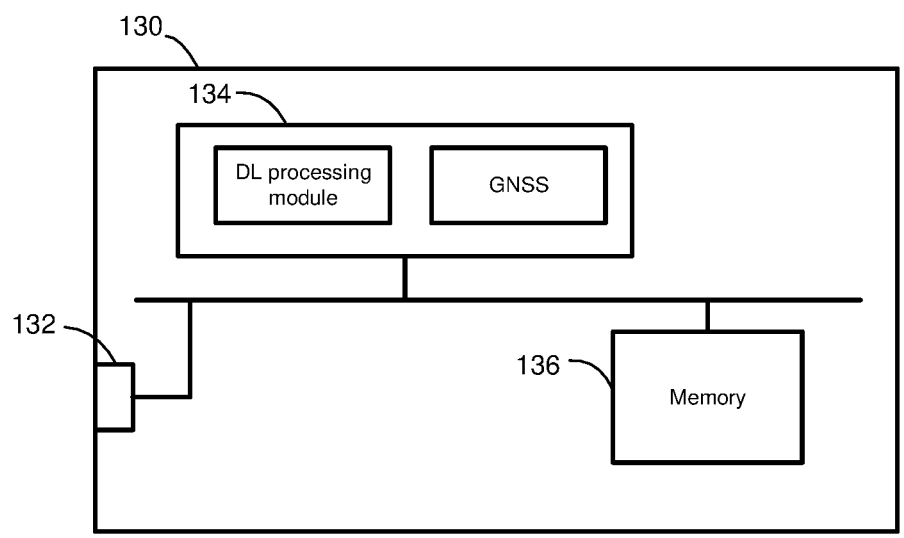
FIG. 3 is a schematic diagram of a user equipment of the network of FIG. 1.

A User Equipment (UE)—UE1—of a user of the first plurality of users is shown in FIG. 3. UE1 130 includes a first communications interface 132, a processor 134 and memory 136. The first communications interface 132 is configured for communications with the first base station 110 using a PD-NOMA scheme such that, in downlink communications, the UE is able to detect its own signal from a composite signal. The UE processor 134 therefore contains a downlink processing module configured for successive interference cancellation of the composite signal. The UE processor 134 also includes a Global Navigation Satellite System (GNSS) module for determining the position of the UE.

UE2 to UE7 include the same components as UE1.

Figure 4:
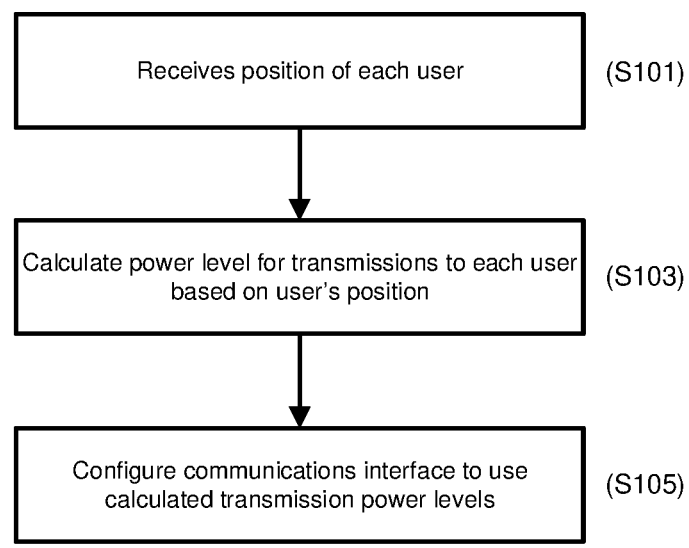
FIG. 4 is a flow diagram illustrating a process of determining transmission power levels in communications from the base station of FIG. 2 to the user equipment of FIG. 3.

As noted above, the first and second base stations 110, 120 both include a downlink processing module configured to calculate the transmission power for each user. The transmission power for each user may be calculated using the following technique (as shown in FIG. 4)—discussed from the perspective of the first base station 110 but also implemented in the second base station 120. In S101, the first base station 110 receives a message from each UE of the first plurality of UE indicating that user's position (as determined by that user's GNSS module). In S103, the first base station 110 calculates the power level for transmissions to each user based on each user's position. In this embodiment, the power level has a positive relationship to the distance between the first base station 110 and the user (such that, as the distance between the first base station 110 and user increases, the transmission power level for that user increases). The power level may also be assigned based on the user's position relative to a series of concentric bands—in which the first base station 110 is positioned at an origin of the concentric bands—such that the first base station 110 determines which band the user resides in and assigns the user a transmission power level for that band. In S105, the first base station 110 configures its second communications interface to use the calculated power level for transmissions to each user.

This technique is beneficial compared to the arrangement of calculating the transmission power level for each user based on the channel quality (as determined through channel estimation) as resources which would otherwise be used for channel estimation can be reallocated and used to improve, for example, a data rate of communications. This is a significant benefit when applied to Frequency Division Duplex (FDD) systems as there is no longer a requirement for estimating the channel, and is also relevant for Time Division Duplex (TDD) systems having limited resources for channel estimation (when using transmission frames having a predominate allocation of downlink timeslots) in which the channel estimation accuracy is reduced due to these limited resources. This technique is also beneficial in pilot-free (also known as pilot-less) wireless telecommunications systems in which no channel estimation takes place by enabling the base station to allocate transmission power levels based on an alternative parameter.

Figure 5:
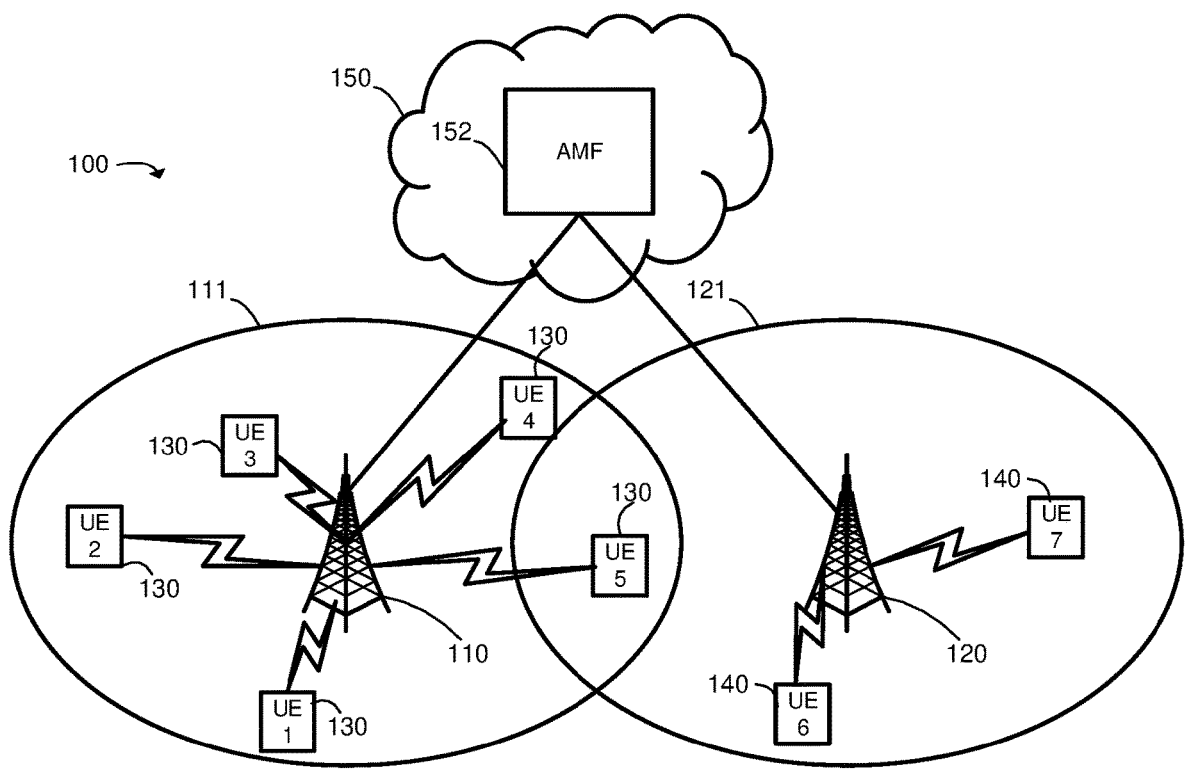
FIG. 5 is a schematic diagram of a wireless telecommunications network at a first time instance prior to implementation of a first embodiment of a method of the present disclosure.
Figure 6:
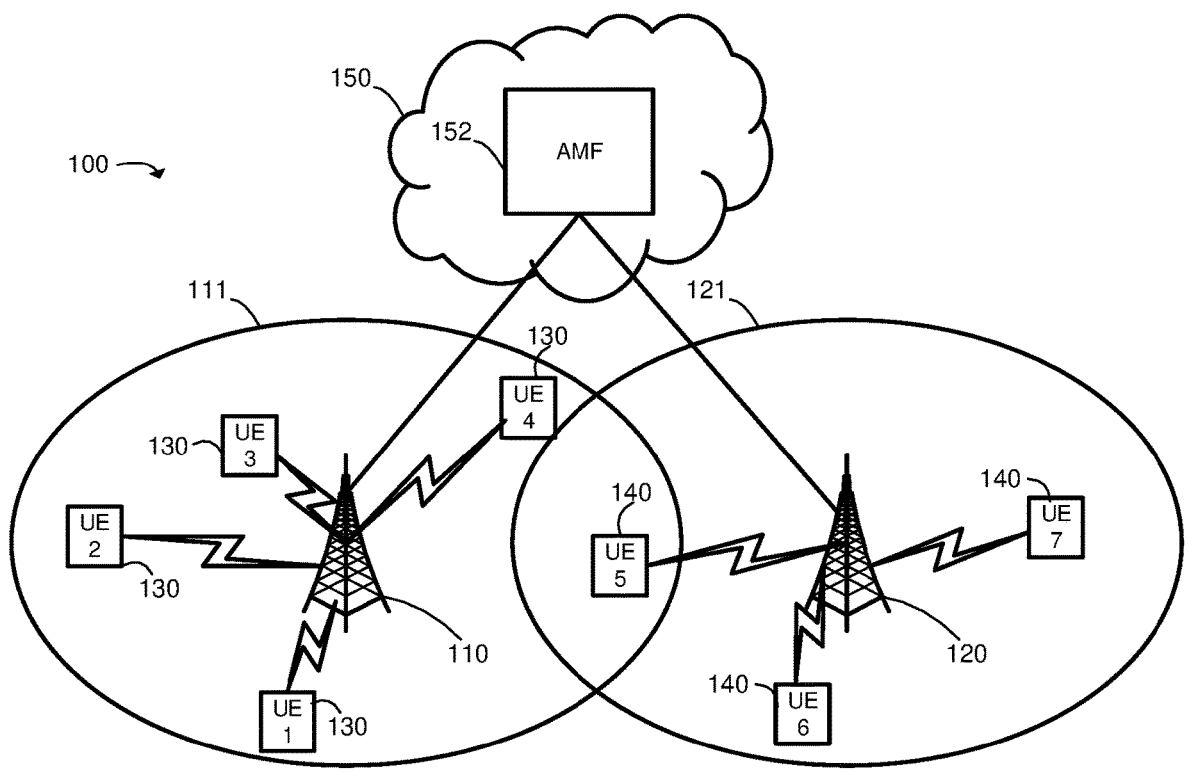
FIG. 6 is a schematic diagram of the wireless telecommunications network at a second time instance following implementation of the first embodiment of the method of the present disclosure.
Figure 7:
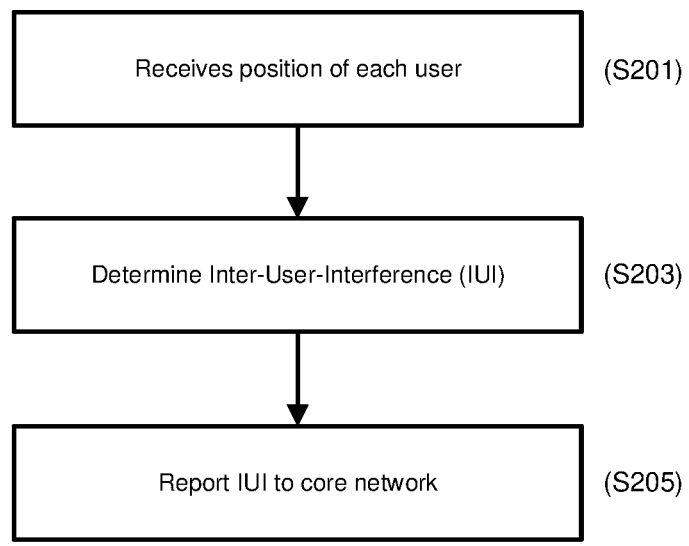
FIG. 7 is a flow diagram illustrating a first process of the first embodiment of the method of the present disclosure.
Figure 8:
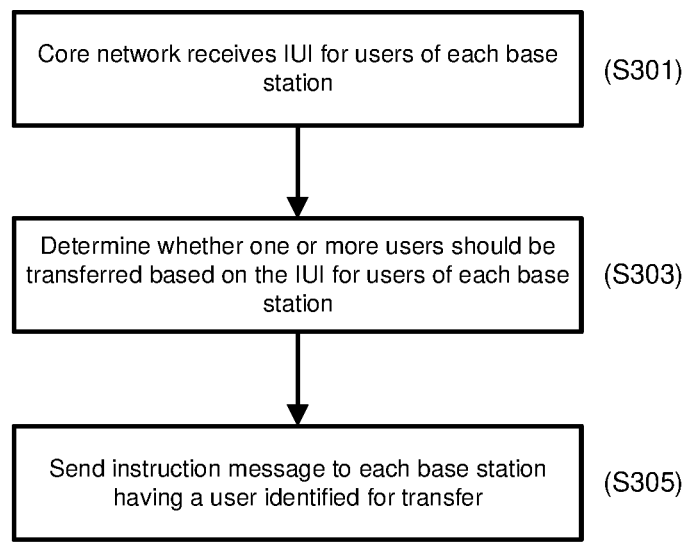
FIG. 8 is a flow diagram illustrating a second process of the first embodiment of the method of the present disclosure.

A first embodiment of a method of the present disclosure will now be described with reference to FIGS. 5 to 8. FIG. 5 illustrates the cellular network 100 at a first time instance before implementation of this first embodiment of a method of the present disclosure, and FIG. 6 illustrates the cellular network 100 at a second time instance following implementation of this first embodiment of a method of the present disclosure. FIGS. 7 and 8 are flow diagrams illustrating the first embodiment. In S201 of a first process of this first embodiment, as illustrated by the flow diagram of FIG. 7, each base station 110, 120 receives a message from each user of its respective plurality of users 130, 140 indicating that user's position. In S203, each base station 110, 120 determines an average Inter-User-Interference (IUI) for its users. The average IUI for users of each base station is calculated by determining the IUI experienced by each user of that base station and averaging those IUI values. The IUI experienced by user i may be represented generally by the following function:

$$IUI_i = H_i \sum_{j=1}^{J} U_j$$

In which i represents the user for which the IUI is being calculated, j represents each other user of the plurality of users connected to the base station serving user i (in which j is a set of 1 to J, in which J is one less than the count of users in the plurality of users connected to the base station serving user i), $U_j$ is the signal for other user j and $H_i$ is the channel between user i and the base station serving user i. The channel $H_i$ may be estimated from the position of user i, received in S201.

The first base station 110 therefore determines the IUI experienced by each user of the first plurality of users (using the above function) and averages these values to determine the average IUI for users of the first base station 110. Similarly, the second base station 120 determines the IUI experienced by each user of the second plurality of users (using the above function) and averages these values to determine the average IUI for users of the second base station 120.

In S205, each base station 110, 120 reports the determined average IUI to the AMF 152 in the core network 150. This report may also contain the count of users, the position of each user, and one or more services associated with each user. This first process may then loop back to S201 and repeated at a later time.

In S301 of a second process of this first embodiment, as illustrated in FIG. 8, the AMF 152 receives the reported average IUI of users of each base station 110, 120 in the network. In S303, the AMF 152 determines whether one or more UE should be transferred between the first and second base stations 110, 120 based on the reported average IUI so as to modify the average IUI of users of each base station. In this first embodiment, the aim of this modification is to balance the average IUI across the first and second base station 110, 120 (in other words, to minimize a difference between the average IUI of users of the first base station 110 and the average IUI of users of the second base station 120). This may be achieved by determining that the average IUI for users of the first base station 110 is greater than the average IUI for users of the second base station 120, and determining how many users should be transferred to the second base station 120 so as to fairly balance average IUI across the first and second base stations 110, 120. This determination may be based on an estimate of the average IUI for users of each base station when one or more users in the overlapping area are transferred between the base stations. The AMF 152 may identify one or more users of the first base station 110 that may be transferred to the second base station 120 based on their position in the overlap of the first and second coverage areas 111, 121. The AMF 152 may then estimate the change in average IUI based on one or more candidate transfers (each candidate transfer specifying a different set of users being transferred between the first and second base stations 110, 120). The candidate transfer that results in the most fairly balanced average IUI (that is, having the smallest difference between the estimated average IUI for users of the first base station 110 and the estimated average IUI for users of the second base station 120) may then be selected. In the example illustrated in FIG. 5, UE5 is identified as the only user in the coverage area overlap, such that there is only a single candidate transfer being a transfer of UE5 from the first base station 110 to the second base station 120.

In S305, the AMF 152 sends an instruction message to each base station having a user identified for transfer identifying 1) each user to be transferred and 2) a destination for each user. In this example, AMF 152 sends an instruction message to the first base station 110 instructing the first base station 110 to initiate a transfer of UE5 to the second base station 120. The first base station 110 reacts to this instruction message by initiating a transfer of UE5 to the second base station 120. FIG. 6 illustrates the cellular network 100 following the transfer of UE5 to the second base station 120.

This first embodiment provides the benefit of modifying the IUI experienced by users of each base station in the network so as to more fairly balance IUI across the base stations. The amount of IUI is a key performance limiting factor in NOMA-based cellular networks, so by balancing IUI across the base stations this first embodiment encourages fair performance for all users. Furthermore, the trigger for transferring a user between base stations—based on the average IUI for all users of the serving base station—is a major departure from the standard trigger for transferring a user (of comparing the user's signal strength to a threshold). Therefore, even if the user's signal strength measurements do not trigger a transfer to another base station, the AMF 152 may still determine that the user should be transferred so as to more fairly balance IUI (and therefore performance) across the base stations in the network.

In the first embodiment, the AMF 152 determines whether one or more UE should be transferred between the first and second base stations 110, 120 based on the reported average IUI so as to reduce the difference in average IUI for users of the first and second base stations 110, 120. However, this is non-essential and the AMF 152 may identify UE transfers based on alternative goals. In another implementation, the AMF 152 may specify an IUI target for each base station in the network, and the one or more UE transfers may be identified such that the average IUI for each base station meets their respective IUI targets.

Furthermore, the target IUI for each base station may be based on a Quality of Service (QoS) requirement for one or more users of the base station. A base station having a higher QoS requirement for its users may be assigned a lower target IUI relative to a base station having a lower QoS requirement for its users. The AMF 152 may then determine, from the reported average IUI of each base station, whether one or more users should be transferred between the first and second base station 110, 120 such that the average IUI of each base station is less than its respective target IUI (even if that would result in the average IUI being increased for a base station when it already has a higher average IUI). The QoS requirement may be determined based on, for example, services available to users (such as emergency services) or contractual obligations (such as a minimum data rate).

In the first embodiment above, the determination of whether to transfer users between base stations so as to modify the average IUI experienced by users of those base stations is performed in a centralized manner in the AMF. However, this is non-essential. There are other centralized entities (such as a Radio Access Network (RAN) Intelligent Controller (RIC) in an Open RAN network or a centralized unit in a disaggregated RAN) that may perform these operations. Furthermore, it is possible for base stations to communicate IUI data with each other and perform this determination in a distributed manner.

Furthermore, in the first embodiment above, the average IUI for users of each base station was calculated as an average of the IUI experienced by each user of the base station (in which IUI experienced by each user is based on the signal for each other user). However, this is non-essential and other aggregate functions may be used. Furthermore, the base station may estimate its average IUI based on its count of users (such that there is a positive relationship between the IUI and the count of users), such that the position of each user is not used to determine the IUI experienced by that user (in which the position is used to estimate the channel for that user). This scenario is more suitable when there is a significant difference between the counts of users of each base station. Whilst the position of each user is useful in determining the average IUI for users of each base station, it is also useful for identifying users that are causing the most IUI for other users—such that the subsequent transfer of users may be to fairly balance these users causing significant IUI.

Figure 9:
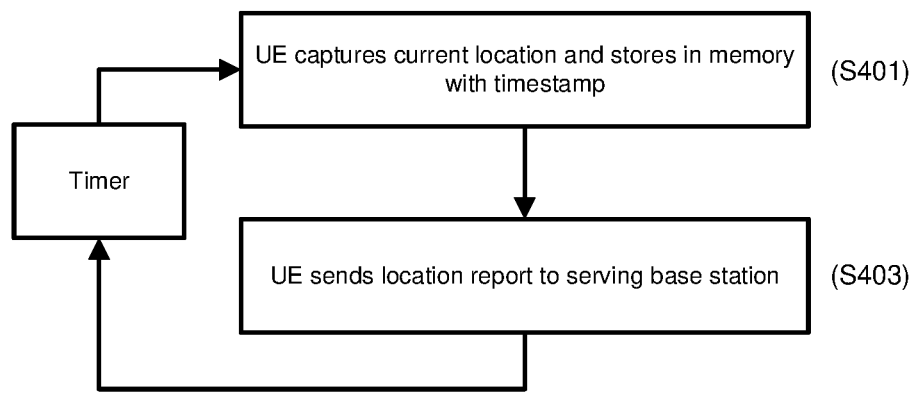
FIG. 9 is a flow diagram illustrating a first process of a second embodiment of the method of the present disclosure.
Figure 10:
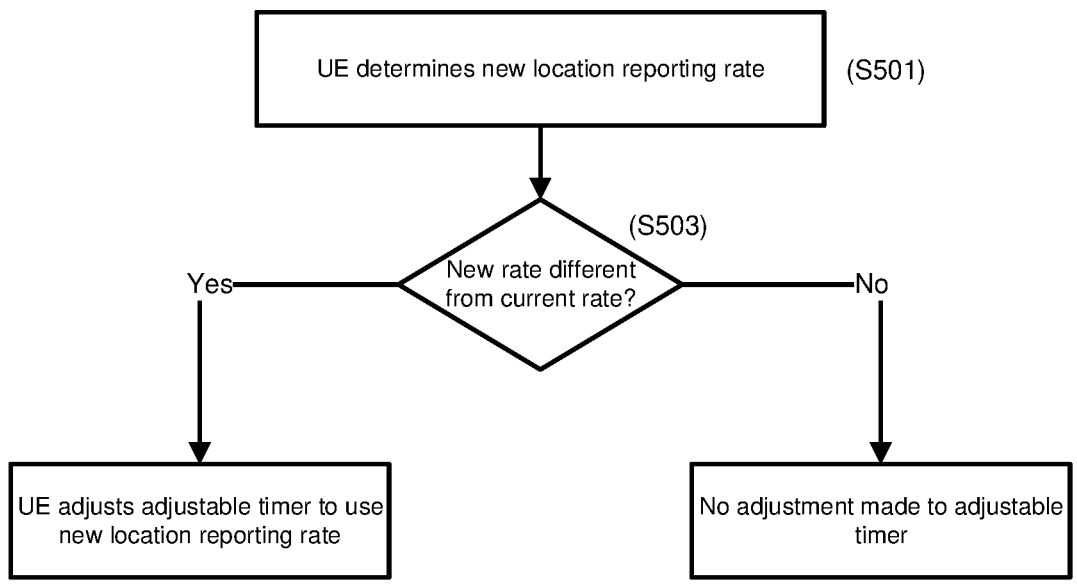
FIG. 10 is a flow diagram illustrating a second process of the second embodiment of the method of the present disclosure.

A second embodiment of a method of the present disclosure will now be described with reference to FIGS. 1, 9 and 10. This second embodiment will be described from the perspective of UE1, but all other users in the cellular network 100 also implement the following operations. The following operations are performed repetitively at a particular rate—an adjustable location reporting rate—by implementing an adjustable timer between repetitions. In S401, as shown in FIG. 9, UE1 captures its current location using its GNSS module and stores its current location in memory with a timestamp indicating the time the location was captured. The current location is stored alongside previous locations of the UE, each associated with a timestamp, in memory. In S403, UE1 sends a location report to the first base station 110. The first process then loops back to S401, via the adjustable timer, for a subsequent performance once the adjustable timer has expired. The UE1 therefore sends a location report to the first base station 110 at a particular reporting rate, which is adjustable by modifying the adjustable timer.

A second process of the second embodiment of the present disclosure will now be described with reference to FIG. 10. In S501, UE1 determines a new location reporting rate. This determination is based on the speed of UE1 (which may be calculated from a plurality of locations, and each location's timestamp, in memory), in which there is a positive relationship between the UE's speed and the location reporting rate (in other words, as the UE speed increases, the location reporting rate increases, and vice versa). In S503, UE1 determines whether the new location reporting rate is different from its current location reporting rate. If so, then UE1 adjusts the adjustable timer (used between iterations of the first process) such that the first process is implemented at the new location reporting rate. If not, then no adjustment is made to the adjustable timer.

As noted above, the first and second base stations 110, 120 implement PD-NOMA schemes in which the determination of the transmission power level for each user for downlink communications is based on the user's position. It is therefore beneficial to have more accurate positioning data so that the transmission power allocation (from the total power budget) for each user is calculated appropriately. This second embodiment provides an improved method of reporting user positions to base stations implementing NOMA schemes that rely on user position by balancing a first requirement for accurate user location reports with a second requirement for prolonging the user's battery life (as higher location reporting rates use more battery power). The location reporting rate is increased as a function of user's speed, such that relatively fast UE have relatively high location reporting rates, and vice versa.

The determination of the new location reporting rate for the UE may be further based on a likelihood of a change in the user's speed. The likelihood of a change in the user's speed may be determined by analyzing the user's recent positions to identify a route (that is, by correlating the user's positions with map data to determine that the route covers a particular pathway, road or train line) and determining, from this route, the likelihood of change in the user's speed. This may be determined by identifying a location on or near the user's route that is indicative of another mode of transport. For example, if the user's current speed indicates that the user is walking but there is a car park of train station on the user's route, then it may be determined that the likelihood of a change in the user's speed is high. In another example, if the user's current speed indicates that the user is walking and there are no nearby locations associated with other modes of transport, then it may be determined that the likelihood of change in the user's speed is low.

The determination of the new location reporting rate for the UE may also be based on a QoS requirement for the user. The location reporting rate may therefore be higher for users having a higher QoS requirement (such as an emergency services user) than the location reporting rate for users having a lower QoS services (such as web browsing, video or voice services). The QoS requirement may be determined based on, for example, services available to users (such as emergency services) or contractual obligations (such as a minimum data rate).

The determination of the reporting rate based on one or more of the user's speed, likelihood of change in the user's speed, and QoS requirements may be implemented in any combination.

In the first and second embodiments above, the UE determines its position using a GNSS module. However, this is non-essential and any other user positioning scheme may be used, such as Observed Time Difference Of Arrival (OTDOA), Uplink Time Difference Of Arrival (UTDOA) and enhanced cell ID.

The skilled person will also understand that the first and second embodiments are not limited to cellular networks, and may be used in any wireless network that implements NOMA. Furthermore, the skilled person will understand that the benefits of the first embodiment of the disclosure may be realized in wireless network implementing other NOMA schemes, such as code domain NOMA, when IUI is a performance limiting factor of the network. The skilled person will also understand that the benefits of the second embodiment of the disclosure may be realized in wireless networks implementing other NOMA schemes when that NOMA scheme utilizes user position data.

In the second embodiment, a new reporting rate for a user is determined by the UE. However, this is non-essential and any other entity (such as a base station, access point or core networking node) may perform this process.

The skilled person will understand that any combination of features is possible within the scope of the disclosure, as claimed.

The invention claimed is:

1. A method of managing users in a wireless telecommunications network having a first access point and a second access point, wherein the first access point communicates with a first set of users using Non-Orthogonal Multiple Access (NOMA) and the second access point communicates with a second set of users using NOMA, the method comprising:
   obtaining data indicating Inter-User-Interference (IUI) for users of the first access point;
   obtaining data indicating IUI for users of the second access point; and
   based on the IUI for users of the first access point and the IUI for users of the second access point, identifying one or more users to transfer between the first access point and the second access point; and
   causing a transfer of the one or more users identified for transfer.

2. The method as claimed in claim 1, wherein identifying one or more users to transfer is to reduce a difference between the IUI for users of the first access point and the IUI for users of the second access point.

3. The method as claimed in claim 1, wherein identifying one or more users to transfer is to cause at least one of: the IUI for users of the first access point to satisfy a first IUI target, or the IUI for users of the second access point to a satisfy a second IUI target.

4. The method as claimed in claim 3, wherein the first IUI target is based on a Quality of Service (QOS) requirement for the first set of users and the second IUI target is based on a QoS requirement for the second set of users.

5. The method as claimed in claim 1, wherein the first access point communicates with the first set of users using Power Domain NOMA (PD-NOMA) and the second access point communicates with the second set of users using PD-NOMA.

6. A non-transitory computer-readable storage medium storing a computer program comprising instructions which, when the computer program is executed by a computer, cause the computer to carry out the method of claim 1.

7. A data processing apparatus comprising a processor configured to perform the method of claim 1.

\* \* \* \* \*